United States Patent
McCusker et al.

(10) Patent No.: US 10,061,480 B1
(45) Date of Patent: Aug. 28, 2018

(54) NAVIGATION CHART INFORMATION GENERATING AND PRESENTING SYSTEM, DEVICE, AND METHOD

(71) Applicant: Rockwell Collins, Inc., Cedar Rapids, IA (US)

(72) Inventors: Patrick D. McCusker, Walker, IA (US); Sarah Barber, Cedar Rapids, IA (US); Bryan C. Schultz, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 420 days.

(21) Appl. No.: 14/811,115

(22) Filed: Jul. 28, 2015

(51) Int. Cl.
| | |
|---|---|
| G06F 3/048 | (2013.01) |
| G06F 3/0483 | (2013.01) |
| G06T 11/20 | (2006.01) |
| G01C 23/00 | (2006.01) |
| G06F 3/0482 | (2013.01) |
| G06F 3/0484 | (2013.01) |

(52) U.S. Cl.
CPC ........... *G06F 3/0483* (2013.01); *G01C 23/00* (2013.01); *G06F 3/0482* (2013.01); *G06F 3/04842* (2013.01); *G06T 11/206* (2013.01)

(58) Field of Classification Search
CPC .. G06F 3/0483; G06F 3/04842; G06F 3/0482; G06T 11/206; G06C 23/00
See application file for complete search history.

(56) References Cited

U.S. PATENT DOCUMENTS

| | | | | |
|---|---|---|---|---|
| 4,975,696 A | * | 12/1990 | Salter, Jr. | ........... B64D 11/0015 340/973 |
| 6,389,355 B1 | * | 5/2002 | Gibbs | .................. G08G 5/0021 434/38 |
| 8,200,378 B1 | | 6/2012 | Chiew et al. | |
| 8,878,872 B1 | | 11/2014 | Raghu et al. | |
| 9,021,384 B1 | * | 4/2015 | Beard | ................... G06F 3/0481 382/105 |
| 2004/0044469 A1 | * | 3/2004 | Bender | .................. G01C 21/36 701/532 |
| 2006/0025920 A1 | * | 2/2006 | Nezu | ....................... G01C 21/36 701/532 |
| 2006/0063539 A1 | * | 3/2006 | Beyer, Jr. | ............ H04M 1/7258 455/456.3 |

(Continued)

*Primary Examiner* — Nicholas Klicos
(74) *Attorney, Agent, or Firm* — Daniel M. Barbieri; Donna P. Suchy; Angel N. Gerdzhikov

(57) ABSTRACT

A system, device, and method for generating and presenting navigation chart information are disclosed. The navigation chart information presenting system may include a display system comprised of one or more display units receiving image data set representative of an image of navigation chart information from an image generator (IG). The IG may be configured to acquire navigation chart data and generate the image data set as a function of the navigation chart data. The navigation chart data could be representative of a plurality of sections shown in a first visual format of a navigation chart, where each section of the plurality of sections is comprised of a plurality of feature names and feature information associated with one of the plurality of feature names. The image data set could be representative of a plurality of page images comprised of at least a portion of the navigation chart information.

20 Claims, 19 Drawing Sheets

(56) References Cited

U.S. PATENT DOCUMENTS

| | | | |
|---|---|---|---|
| 2006/0073832 A1* | 4/2006 | Pfister | H04L 41/12 455/446 |
| 2007/0185895 A1* | 8/2007 | Hogue | G06F 17/30554 |
| 2008/0077642 A1* | 3/2008 | Carbone | G06F 17/30241 709/203 |
| 2008/0249675 A1* | 10/2008 | Goodman | B64C 25/426 701/16 |
| 2010/0268448 A1* | 10/2010 | Doan | G01C 21/367 701/533 |
| 2011/0313597 A1* | 12/2011 | Wilson | G01C 23/00 701/3 |
| 2012/0016576 A1* | 1/2012 | Huang | G01C 21/3469 701/423 |
| 2012/0035849 A1* | 2/2012 | Clark | G01C 23/00 701/467 |
| 2012/0310450 A1* | 12/2012 | Srivastav | G08G 5/0021 701/3 |
| 2014/0280180 A1* | 9/2014 | Edecker | G06F 17/30867 707/740 |
| 2016/0258775 A1* | 9/2016 | Santilli | G01C 21/36 |
| 2017/0345318 A1* | 11/2017 | Kim | B64D 43/00 |

* cited by examiner

| | CHART | | FMS | |
|---|---|---|---|---|
| SBGL/GIG GALEAO-ANTONIO CARLOS JOBIM INTL | | | RIO DE JANEIRO, BRAZIL DESCENT CHARLIE 4 ILS Rwy 10 | |

21 SEP 07

| APCH | Notes | Missed | Comms |

| | CHART | | FMS | |
|---|---|---|---|---|
| MSA | FL75 | | | |
| LOC | ITB | 109.3 | 109.3 | [G] |
| CRS | 096° | | 098° | [Y] |
| G/S | 3.00° | | 3.00° | [G] |
| LOM | G/S 2100' | 6.2 | | |
| MM | G/S 240' | 0.5 | | |
| DA | 218' | | 218' | [G] |
| IM | | 0.2 | | |
| Ceiling | 200' | | | |
| Visibility | 800m | | | |
| ALS | ALSF - II | | | |
| TDZE | 18' | | 18' | [G] |
| Apt | 28' | | 28' | [G] |

[G] = Green      [Y] = Yellow

| | CHART | | FMS |
|---|---|---|---|
| | | | |

SBGL/GIG — RIO DE JANEIRO, BRAZIL
GALEAO-ANTONIO — DESCENT CHARLIE 4
CARLOS JOBIM INTL — ILS Rwy 10

21 SEP 07

APCH | Notes | Missed | Comms

| | CHART | | FMS |
|---|---|---|---|
| MSA | FL75 | | |
| LOC | ITB | 109.3 | 109.3 [G] |
| CRS | 096° | | 096° [Y] |
| G/S | 3.00° | | 3.00° [G] |
| LOM | G/S 2100' | 6.2 | |
| MM | G/S 240' | 0.5 | |
| DA | 218' | | 218' [G] |
| IM | | 0.2 | |

| | | | |
|---|---|---|---|
| Ceiling | 200' | | |
| Visibility [Y] | 1200m [Y] | ALS out [Y] | |
| ALS [Y] | OUT [Y] | NOTAM [Y] | |
| TDZE | 18' | | 18' [G] |
| Apt | 28' | | 28' [G] |

[G] = Green   [Y] = Yellow

| | CHART | | FMS |
|---|---|---|---|

SBGL/GIG      RIO DE JANEIRO, BRAZIL
GALEAO-ANTONIO      DESCENT CHARLIE 4
CARLOS JOBIM INTL      ILS Rwy 10

21 SEP 07

| APCH | Notes | Missed | Comms |
|---|---|---|---|

| | CHART | | FMS |
|---|---|---|---|
| MSA | FL75 | | |
| LOC | ITB | 109.3 | 109.3 [G] |
| CRS | 096° | | 098° [Y] |
| G/S [Y] | OUT [Y] | NOTAM | 3.00° [Y] |
| LOM | G/S 2100' | 6.2 | |
| MM | G/S 240' | 0.5 | |
| MDA [Y] | 500' [Y] | G/S Out [Y] | 218' [Y] |
| IM | | 0.2 | |
| Ceiling [Y] | 500' [Y] | G/S out [Y] | |
| Visibility [Y] | 1200m [Y] | G/S out [Y] | |
| ALS | ALSF-2 | | |
| TDZE | 18' | | 18' [G] |
| Apt | 28' | | 28' [G] |

[G] = Green      [Y] = Yellow

| SBGL/GIG | | | | RIO DE JANEIRO, BRAZIL |
|---|---|---|---|---|
| GALEAO-ANTONIO | | | | DESCENT CHARLIE 4 |
| CARLOS JOBIM INTL | | 21 SEP 07 | | ILS Rwy 10 |

Approach | Notes | Missed | Comms

| MSA | FL75 | | | | | |
|---|---|---|---|---|---|---|
| LOC | ITB | 109.3 | | FMS [G] | 109.3 | [G] |
| CRS | 096° | | | FMS [R] | 098° | [R] |
| G/S | 3.00° | | | FMS [G] | 3.00° | [G] |
| LOM | G/S 2100' | 6.2 | | | | |
| MM | G/S 240' | 0.5 | | | | |
| DA | 218' | | | FMS [G] | 218' | [G] |
| IM | | 0.2 | | | | |

===========================================

| Ceiling | 200' | | | | |
|---|---|---|---|---|---|
| Visibility | 800m | | | | |
| ALS | ALSF - II | | | | |
| TDZE | 18' | | FMS [G] | 18' | [G] |
| Apt | 28' | | FMS [G] | 28' | [G] |

[G] = Green        [R] = Red

| SBGL/GIG | | | RIO DE JANEIRO, BRAZIL |
| GALEAO-ANTONIO | | | DESCENT CHARLIE 4 |
| CARLOS JOBIM INTL | | 21 SEP 07 | ILS Rwy 10 |

| Approach | Notes | Missed | Comms |

| MSA | FL75 | | | |
| LOC | ITB | 109.3 | FMS [G] | 109.3 [G] |
| CRS | 096° | | FMS [R] | 096° [R] |
| G/S | 3.00° | | FMS [G] | 3.00° [G] |
| LOM | G/S 2100' | 6.2 | | |
| MM | G/S 240' | 0.5 | | |
| DA | 218' | | FMS [G] | 218' [G] |
| IM | | 0.2 | | |

==========================================================

| Ceiling | 200' | | | |
| Visibility [R] | 1200m [R] | ALS out [R] | | |
| ALS [R] | OUT [R] | NOTAM [R] | | |
| TDZE | 18' | | FMS [G] | 18' [G] |
| Apt | 28' | | FMS [G] | 28' [G] |

[G] = Green          [R] = Red

FIG. 4B

| SBGL/GIG | | | RIO DE JANEIRO, BRAZIL |
|---|---|---|---|
| GALEAO-ANTONIO | | | DESCENT CHARLIE 4 |
| CARLOS JOBIM INTL | | 21 SEP 07 | ILS Rwy 10 |

| Approach | Notes | Missed | Comms |
|---|---|---|---|
| MSA | FL75 | | | |
| LOC | ITB | 109.3 | FMS [G] | 109.3 [G] |
| CRS | 096° | | FMS [R] | 098° [R] |
| G/S [R] | OUT [R] | NOTAM | FMS [R] | 3.00° [R] |
| LOM | G/S 2100' | 6.2 | | |
| MM | G/S 240' | 0.5 | | |
| MDA [R] | 500' [R] | G/S Out [R] | FMS [R] | 218' [R] |
| IM | | 0.2 | | |

==============================================

| Ceiling [R] | 500' | G/S out | | |
|---|---|---|---|---|
| Visibility [R] | 1200m | G/S out | | |
| ALS | ALSF-2 | | | |
| TDZE | 18' | | FMS [G] | 18' [G] |
| Apt | 28' | | FMS [G] | 28' [G] |

[G] = Green    [R] = Red

FIG. 4C

┌─────────────────────────────────────┐
│ SBGL/GIG        RIO DE JANEIRO, BRAZIL │
│ GALEAO-ANTONIO   DESCENT CHARLIE 4  │
│ CARLOS JOBIM INTL       ILS Rwy 10  │
│           21 SEP 07                 │
│  ┌──────┐┌──────┐┌──────┐┌──────┐   │
│  │ APCH ││ Notes││Missed││Comms │   │
│                                     │
│  ALT SET:      HPA                  │
│                                     │
│  TDZ ELEV:     1 HPA                │
│                                     │
│  TRANS LEVEL:  BY ATC               │
│                                     │
│  TRANS ALT:    5000'                │
│                                     │
│  NOTE 1:       PENETRATION BASED ON │
│                220 KTS IAS, RATE OF │
│                DESCENT 2000' / MIN. │
│                                     │
└─────────────────────────────────────┘

```
           ┌─ 162
           ↙
┌─────────────────────────────────────────────┐
│ SBGL/GIG                RIO DE JANEIRO, BRAZIL│
│ GALEAO-ANTONIO           DESCENT CHARLIE 4   │
│ CARLOS JOBIM INTL  21 SEP 07      ILS Rwy 10 │
│  ╱Approach╲╱ Notes ╲╱ Missed ╲╱ Comms ╲      │
│ ┌──────────────────────────────────────────┐ │
│ │                                          │ │
│ │  ALT SET:        HPA                     │ │
│ │  TDZ ELEV:       1 HPA                   │ │
│ │  TRANS LEVEL:    BY ATC                  │ │
│ │  TRANS ALT:      5000'                   │ │
│ │  NOTE 1:         PENETRATION BASED ON 220 KTS IAS, │
│ │                  RATE OF DESCENT 2000' / MIN.      │
│ │                                          │ │
│ └──────────────────────────────────────────┘ │
└─────────────────────────────────────────────┘
```

FIG. 5B

┌─────────────────────────────────────────┐
| SBGL/GIG            RIO DE JANEIRO, BRAZIL |
| GALEAO-ANTONIO      DESCENT CHARLIE 4      |
| CARLOS JOBIM INTL             ILS Rwy 10   |
|            21 SEP 07                       |
| \ APCH / \ Notes / \ Missed / \ Comms /   |
|                                            |
| MISSED APCH:  CLIMB TO 2000' ON 096 HEADING TO |
|               INTERCEPT INBOUND MRC VOR R-335, |
|               PROCEED TO MRC VOR CLIMBING TO   |
|               5000' AND HOLD.                  |
|                                            |
└─────────────────────────────────────────┘
← 170

```
SBGL/GIG                              RIO DE JANEIRO, BRAZIL
GALEAO-ANTONIO                           DESCENT CHARLIE 4
CARLOS JOBIM INTL      21 SEP 07               ILS Rwy 10
```

| Approach | Notes | Missed | Comms |

MISSED APCH:   CLIMB TO 2000' ON 096 HEADING TO INTERCEPT
               INBOUND MRC VOR R-335, PROCEED TO
               MRC VOR CLIMBING TO 5000' AND HOLD.

| SBGL/GIG | RIO DE JANEIRO, BRAZIL |
| --- | --- |
| GALEAO-ANTONIO | DESCENT CHARLIE 4 |
| CARLOS JOBIM INTL | ILS Rwy 10 |

21 SEP 07

| APCH | Notes | Missed | Comms |

| ATIS | 127.6 |
| --- | --- |
| APPROACH | RIO CONTROL (R)<br>119.0  118.35  120.55<br>128.9  129.2  129.8  132.2 |
| TOWER | GALEAO<br>118.0  118.2 |
| GROUND | 121.65 |

| SBGL/GIG | | | RIO DE JANEIRO, BRAZIL |
|---|---|---|---|
| GALEAO-ANTONIO | | | DESCENT CHARLIE 4 |
| CARLOS JOBIM INTL | | 21 SEP 07 | ILS Rwy 10 |

Approach | Notes | Missed | Comms

ATIS     127.6

APPROACH     RIO CONTROL (R)
119.0  118.35  120.55
128.9  129.2  129.8  132.2

TOWER     GALEAO
118.0  118.2

GROUND     121.65

```
SBGL/GIG                              RIO DE JANEIRO, BRAZIL
GALEAO-ANTONIO                           DESCENT CHARLIE 4
CARLOS JOBIM INTL        21 SEP 07              ILS Rwy 10
```

| | | | | | | |
|---|---|---|---|---|---|---|
| MSA | FL75 | | | | | |
| LOC | ITB | 109.3 | FMS | [G] | 109.3 | [G] |
| CRS | 096° | | FMS | [Y] | 098° | [Y] |
| G/S | 3.00° | | FMS | [G] | 3.00° | [G] |
| LOM | G/S 2100' | 6.2 | | | | |
| MM | G/S 240' | 0.5 | | | | |
| DA | 218' | | FMS | [G] | 218' | [G] |
| IM | | 0.2 | | | | |
| ================================================== | | | | | | |
| Ceiling | 200' | | | | | |
| Visibility | 800m | | | | | |
| ALS | ALSF - II | | | | | |
| TDZE | 18' | | FMS | [G] | 18' | [G] |
| Apt | 28' | | FMS | [G] | 28' | [G] |

Sections: Approach, Notes, Missed, Comms

[G] = Green     [Y] = Yellow

| Page ▼ | |
|---|---|
| Approach | |
| Notes | RIO DE JANEIRO, BRAZIL |
| Missed  ONIO | DESCENT CHARLIE 4 |
| Comms  M INTL   21 SEP 07 | ILS Rwy 10 |

| | | | | | | |
|---|---|---|---|---|---|---|
| MSA | FL75 | | | | | |
| LOC | ITB | 109.3 | | FMS [G] | 109.3 | [G] |
| CRS | 096° | | | FMS [R] | 098° | [R] |
| G/S | 3.00° | | | FMS [G] | 3.00° | [G] |
| LOM | G/S 2100' | 6.2 | | | | |
| MM | G/S 240' | 0.5 | | | | |
| DA | 218' | | | FMS [G] | 218' | [G] |
| IM | | 0.2 | | | | |

==================================================

| | | | | | |
|---|---|---|---|---|---|
| Ceiling | 200' | | | | |
| Visibility | 800m | | | | |
| ALS | ALSF - II | | | | |
| TDZE | 18' | | FMS [G] | 18' | [G] |
| Apt | 28' | | FMS [G] | 28' | [G] |

[G] = Green    [R] = Red

| Approach | Notes | Missed | Comms |

SBGL/GIG  RIO DE JANEIRO, BRAZIL
GALEAO-ANTONIO  DESCENT CHARLIE 4
CARLOS JOBIM INTL  21 SEP 07  ILS Rwy 10

| | | | | | | |
|---|---|---|---|---|---|---|
| MSA | FL75 | | | | | |
| LOC | ITB | 109.3 | | FMS [G] | 109.3 | [G] |
| CRS | 096° | | | FMS [R] | 098° | [R] |
| G/S | 3.00° | | | FMS [G] | 3.00° | [G] |
| LOM | G/S 2100' | 6.2 | | | | |
| MM | G/S 240' | 0.5 | | | | |
| DA | 218' | | | FMS [G] | 218' | [G] |
| IM | | 0.2 | | | | |

============================================

| | | | | |
|---|---|---|---|---|
| Ceiling | 200' | | | |
| Visibility | 800m | | | |
| ALS | ALSF - II | | | |
| TDZE | 18' | | FMS [G] | 18' [G] |
| Apt | 28' | | FMS [G] | 28' [G] |

[G] = Green    [R] = Red

FIG. 8C

NAVIGATION CHART INFORMATION GENERATING AND PRESENTING SYSTEM, DEVICE, AND METHOD

BACKGROUND

The Federal Aviation Administration of the United States (FAA) publishes a manual entitled "Instrument Flying Handbook," a publication to which pilots may refer when being trained to fly under instrument flight rules (IFR). Part of training involves the use of an instrument approach procedure (IAP) chart which provides the method to descend and land safely in low visibility conditions. The FAA establishes an IAP after thorough analyses of obstruction, terrain features, and navigational facilities. Maneuvers, including altitude changes, course corrections, and other limitations, are prescribed in the IAP. The approach charts, commonly referred to as approach plates, reflect the criteria associated with the US Standard for Terminal Instrument Approach Procedures (TERPs), which prescribes standardization methods for use in designing instrument flight procedures.

IAP charts are published by the FAA and other publishers. The format of the FAA IAP chart is standardized and includes the following sections: margin identification, pilot briefing (and notes), plan view, profile view, landing minimums, and airport diagram. Each of these is discussed in the "Instrument Flying Handbook."

Another publisher of IAP charts is Jeppesen. Headquartered in Inverness, Colo., United States, Jeppesen is owned by The Boeing Company, a well-known manufacturer of aircraft. Colloquially referred to as "Jepp charts" or "Jepps," Jeppesen IAP charts are popular among pilots, and their popularity extends to electronic charts that replicate the paper IAP charts on electronic displays.

The format of the Jeppesen IAP chart is also standardized and includes the following sections: heading, communications, briefing information, minimum safe altitude (MSA), plan view, profile view, conversion tables, icons, and landing minimums. Each of these will be discussed herein.

The IAP chart is mainly used as the pilot or crew prepares to perform the IAP. The pilot or crew reviews the IAP and notes for any unusual conditions applicable to the IAP, and verifies that the aircraft equipment such as displays, autoflight system, and flight management system (FMS) are properly configured for the IAP.

During training, pilots are trained to look (or glance) at the IAP chart while flying the IAP. Because the format is standardized, pilots learn to look to the part of the page containing the information they seek. Because the IAP chart contains the information pilots need to fly the IAP on one side of a page, the amount of space needed is relatively significant, taking up a significant amount of "display real estate" and causing pilots to having shift their eyes to different sections of the page.

The IAP chart is a very dense collection of information printed on a sheet of paper having the size of 5½ inches by 8½ inches. Some of the information may be "small print" and easy to overlook. Although the standardized format is useful for the production of the IAP chart and pilots have learned to glean important IAP by shifting their eyes to all parts of the chart, it still imparts a visual burden.

Also, much of the same information contained in the plan view and profile view sections of the IAP chart are also presented on or in a horizontal situation display (HSD) and/or vertical situation display (VSD). For a pilot using the IAP chart in an aircraft that is equipped with the HSD and/or VSD, there exists a redundancy of IAP information that may not be necessary. This contributes to a significant waste of display space. Also, the information contained in the other sections of the IAP chart is presented in a compact, difficult-to-read format which is not organized in a way that is easy for the pilot to comprehend. Much of this information is specific to a particular set of landing configurations (such as an approach lighting system being inoperative) that do not occur on a regular basis.

SUMMARY

Embodiments of the inventive concepts disclosed herein are directed to a system, device, and method for generating and presenting navigation chart information to provide an image of pilot-friendly, navigation chart information. The image of navigation chart information generated and presented by the inventive concepts disclosed herein may provide a more compact area to which the pilot may focus to reduce the pilot's eye movement when reading the information depicted in a navigation chart. Redundant information contained in some sections of the IAP chart may be omitted, and other sections may be reorganized and presented in an order that is most commonly used by the pilot. In addition, IAP chart information is presented on the same page with FMS information, so that the pilot or crew may verify that the FMS is properly programmed.

In one aspect, embodiments of the inventive concepts disclosed herein are directed to a system for presenting navigation chart information. The system may include a source of navigation chart data, a source of navigation data, an image generator (IG), and a display system.

In a further aspect, embodiments of the inventive concepts disclosed herein are directed to a device for generating navigation chart information. The device may include the IG and may be configured to perform the method as disclosed in the following paragraph.

In a further aspect, embodiments of the inventive concepts disclosed herein are directed to a method for generating navigation chart information. When properly configured, the IG may acquire navigation chart data and generate the image data set as a function of the acquired navigation chart data and representative of an image of navigation chart information. The navigation chart data could be representative of a plurality of sections shown in a first visual format of a navigation chart, where each section of the plurality of sections is comprised of a plurality of feature names and feature information associated with one of the plurality of feature names. The image data set could be representative of a plurality of page images presented in a second visual format.

BRIEF DESCRIPTION OF THE DRAWINGS

FIG. 3A depicts a first tabbed page for presenting IAP information.

FIG. 3B depicts the first tabbed format of FIG. 3A presenting IAP information relative to a Notice to Airmen (NOTAM) containing information of an Approach Lighting System (ALS) outage.

FIG. 3C depicts the first tabbed format of FIG. 3A presenting IAP information relative to a NOTAM containing information of a Glideslope (GS) outage.

FIG. 4A depicts an alternative configuration for presenting the information of FIG. 3A.

FIG. 4B depicts an alternative configuration for presenting the information of FIG. 3B.

FIG. 4C depicts an alternative configuration for presenting the information of FIG. 3C.

FIG. 5A depicts a second tabbed format presenting notes relative to the approach procedure.

FIG. 5B depicts an alternative configuration for presenting the information of FIG. 5A.

FIG. 6A depicts a third tabbed format presenting Missed Approach Procedure (MAP) instructions.

FIG. 6B depicts an alternative configuration for presenting the information of FIG. 6A.

FIG. 7A depicts a fourth tabbed format presenting communication frequency information relative to the IAP.

FIG. 7B depicts an alternative configuration for presenting the information of FIG. 7A.

FIG. 8A depicts an alternative placement of tabs.

FIG. 8B depicts an alternative configuration of accessing a page of IAP information.

FIG. 8C depicts a second alternative configuration of accessing a page of IAP information.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 1A:
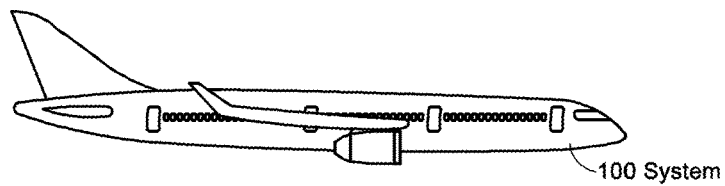
FIG. 1A depicts an aircraft configured with a navigation chart information generation and presentation system according to the inventive concepts disclosed herein.
Figure 1B:
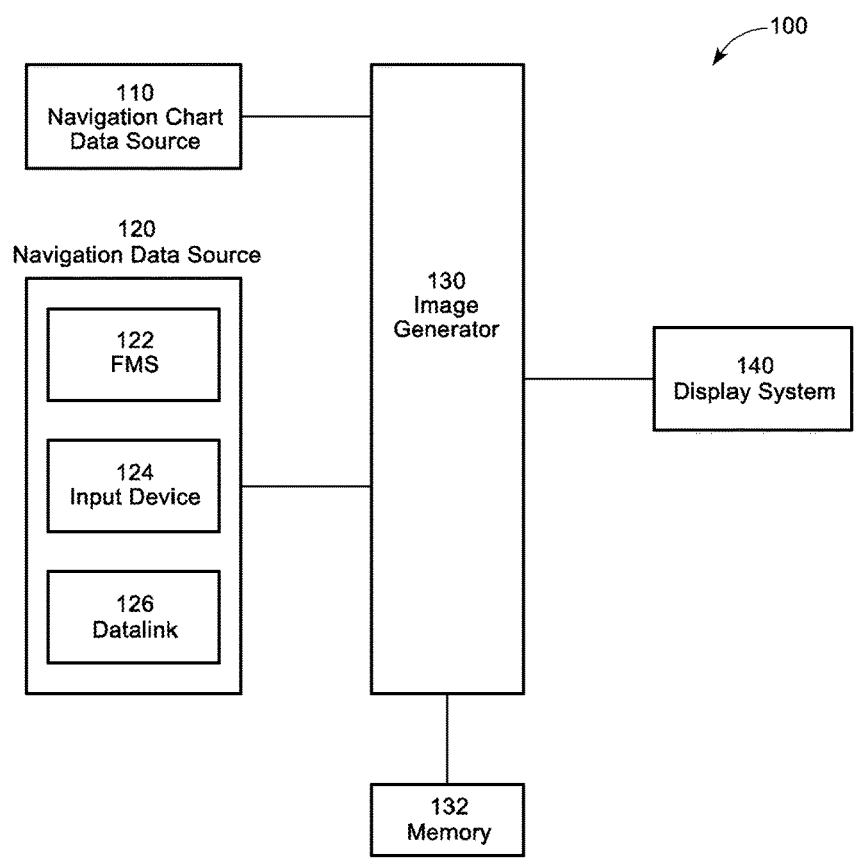
FIG. 1B depicts a functional block diagram of the generation and presentation system of FIG. 1A.

FIG. 1A depicts an aircraft configured with a navigation chart information generating system 100 suitable for implementation of the techniques described herein. FIG. 1B depicts a functional block diagram of the navigation chart information generating system 100 suitable for implementation of the techniques described herein. The functional blocks of the system 100 include a navigation chart data source 110, a navigation data source 120, an image generator (IG) 130, and a display system 140.

The navigation chart data source 110 could comprise any source of navigation chart information data. A navigation chart may be any map or chart which provides navigation information to assist in the navigation of a vehicle. As embodied herein, the navigation chart may be comprised of one or more navigation charts, and a non-exhaustive list of navigation charts includes an instrument approach procedures (IAP) charts used by a pilot during the performance of an IAP. A detailed discussion of aeronautical charts has been described by Raghu et al. in U.S. Pat. No. 8,878,872 entitled "System, Device and Method for Generating an Overlay of Navigation Chart Information," a publication which is hereby incorporated by reference in its entirety.

While the discussion herein is drawn to navigation information "printed on" paper charts, the usage of the term "printed on" is synonymous and interchangeable with information "published to" charts, where charts that are "published to" could be those charts on which information is not actually printed; for example, information may be "published to" charts that are electronically presentable by the display system 140.

It should be noted that, for the purpose of illustration and not of limitation, the discussion that follows is drawn to IFR (Instrument Flight Rules) charts including instrument approach procedures (IAP) charts. In addition to IFR charts, the FAA publishes many types of aeronautical charts including, but not limited to, VFR (Visual Flight Rules) charts.

It should be noted that, in some embodiments for any source or system in an aircraft including the navigation chart data source 110, data could be comprised of any analog or digital signal, either discrete or continuous, which could contain information or be indicative of information. In some embodiments, aircraft could mean any vehicle which is able to fly through the air or atmosphere including, but not limited to, lighter than air vehicles and heavier than air vehicles, wherein the latter may include manned or unmanned fixed-wing and rotary-wing vehicles.

The navigation data source 120 could include any source(s) which provides navigation and/or navigation-related data information in an aircraft. The navigation data source 120 could include a flight management system (FMS) 122, an input device 124, and a datalink 126. The FMS 122 is known to those skilled in the art for performing a variety of functions designed to help a pilot with the management of the flight. These functions could include receiving a flight plan and constructing a lateral and vertical flight path from the flight plan. In addition, the flight plan could include an IAP for a runway at an airport of intended landing.

The FMS 122 could include a navigation database comprised of data representative of, but not limited to, IAPs, ground-based navigational aids, waypoints, holding patterns, airways, airports, heliports, instrument departure procedures, precision approach aids, company routes, airport communications, localizer and airway markers, restricted airspace, and/or airport sector altitudes. The flight navigation database could be a database described in the following document published by Aeronautical Radio, Incorporated (ARINC): ARINC Specification 424-18 entitled "Navigations Systems Data Base" (ARINC 424), an aviation-industry publication that is hereby incorporated by reference in its entirety. The FMS 122 may output data representative of navigation data to the IG 130

The input device 124 could comprise any source for facilitating a pilot's interaction with links and/or graphical user interfaces (singularly, GUI) referred to as interactive widgets that are presentable by the display system 140. The input device 124 may include any device that allows for the selection of a widget and/or entry of data. Such devices could include, but are not limited to, a tactile device (e.g., keyboard, control display unit, cursor control device, stylus, electronic grease pen, handheld device, touch screen device, notebook, tablet, electronic flight bag, user-wearable device, etc. . . . ) and/or speech recognition systems. The input device 124 could be integrated with a display unit of the display system 140 if it is configured to receive pilot input (e.g., handheld device, touch screen device, notebook, tablet, etc. . . . ). The input device 124 may provide data representative of navigation data including a pilot's selection to the IG 130.

In some embodiments, a pilot may enter a Notices to Airmen (NOTAM) through the input device 124. A detailed discussion of NOTAMs has been described by Chiew et al. in U.S. Pat. No. 8,200,378 entitled "System, Module, and Method for Presenting NOTAM Information on an Aircraft Display Unit," a publication which is hereby incorporated by reference in its entirety.

The datalink 126 could be comprised of any system(s) through which, navigation and/or navigation-related data may be received from a source that is external to the aircraft. Data representative of a flight plan may be received through the datalink 126, thereby providing a source of navigation data to the IG 130. In addition, navigation-related data such as NOTAM data could be received through the datalink 126. The datalink 126 is a system known to those skilled in the art The IG 130 could include any electronic data processing unit which executes software or computer instruction code that could be stored, permanently or temporarily, in a digital memory storage device or a non-transitory computer-readable media (generally, memory 132) including, but not limited to, random access memory (RAM), read-only memory (ROM), compact disc (CD), hard disk drive, diskette, solid-state memory, Personal Computer Memory Card International Association card (PCMCIA card), secure digital cards, and compact flash cards. The IG 130 may be driven by the execution of software or computer instruction code containing algorithms developed for the specific functions embodied herein. The IG 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the IG 130 could also include more than one electronic data processing unit. In some embodiments, the IG 130 could be a processor(s) used by or in conjunction with any other system of the aircraft including, but not limited to, the navigation chart data source 110, the navigation data source 120, and the display system 140.

In some embodiments, the terms "programmed" and "configured" are synonymous. The IG 130 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless network, or as a signal received and/or transmitted by the IG 130 via a physical or a virtual computer port. The IG 130 may be programmed or configured to execute the method discussed in detail below. The IG 130 may be programmed or configured to provide output data to various systems and/or units including, but not limited to, the display system 140.

The display system 140 may include one or more display units configured to present information visually to the pilot. The display unit could be part of an Electronic Flight Information System (EFIS) and could be comprised of, but is not limited to, a Primary Flight Display (PFD), Navigation Display (ND), Head-Up Display (HUD), Head-Down Display (HDD), Multi-Purpose Control Display Unit, Engine Indicating and Crew Alerting System, Electronic Centralized Aircraft Monitor, Multi-Function Display, Side Displays, Electronic Flight Bags, Portable Electronic Devices (e.g., laptops, smartphones, tablets), and/or user-wearable devices such as wrist- and head-mounted devices). The display system 140 may be configured to present one or more display(s) or image(s). In some embodiments, the terms "display" and "image" are interchangeable and treated synonymously.

Figure 2A:
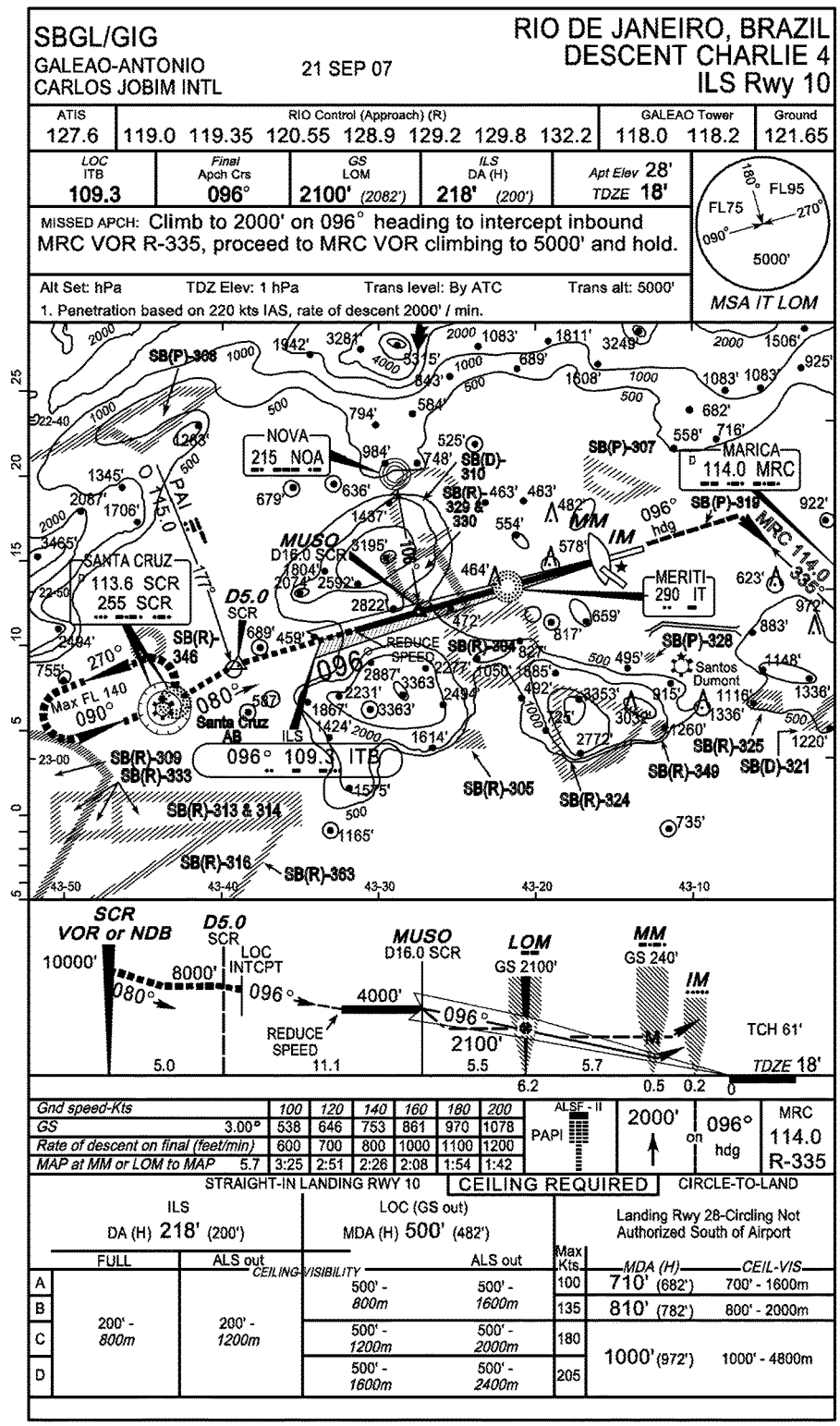
FIG. 2A depicts an exemplary instrument approach procedure (IAP) chart.

Referring now to FIG. 2A, an exemplar of a Jepp chart is provided for the sole purpose of illustration and not of limitation; it should be neither used nor relied upon for the purpose of navigation or flying the IAP. FIG. 2A illustrates a Jepp chart of a "DESCENT CHARLIE 4 ILS Rwy 10" IAP established for Runway 10 at Galeao-Antonio Carlos Jobim International Airport in Rio De Janeiro, Brazil, as indicated by the four-letter identifier "SBGL," the airport code assigned by the International Civil Aviation Organization (ICAO); the airport is also identified by the three-letter identifier "GIG," the airport code assigned by the International Air Transport Association (IATA).

Figure 2B:
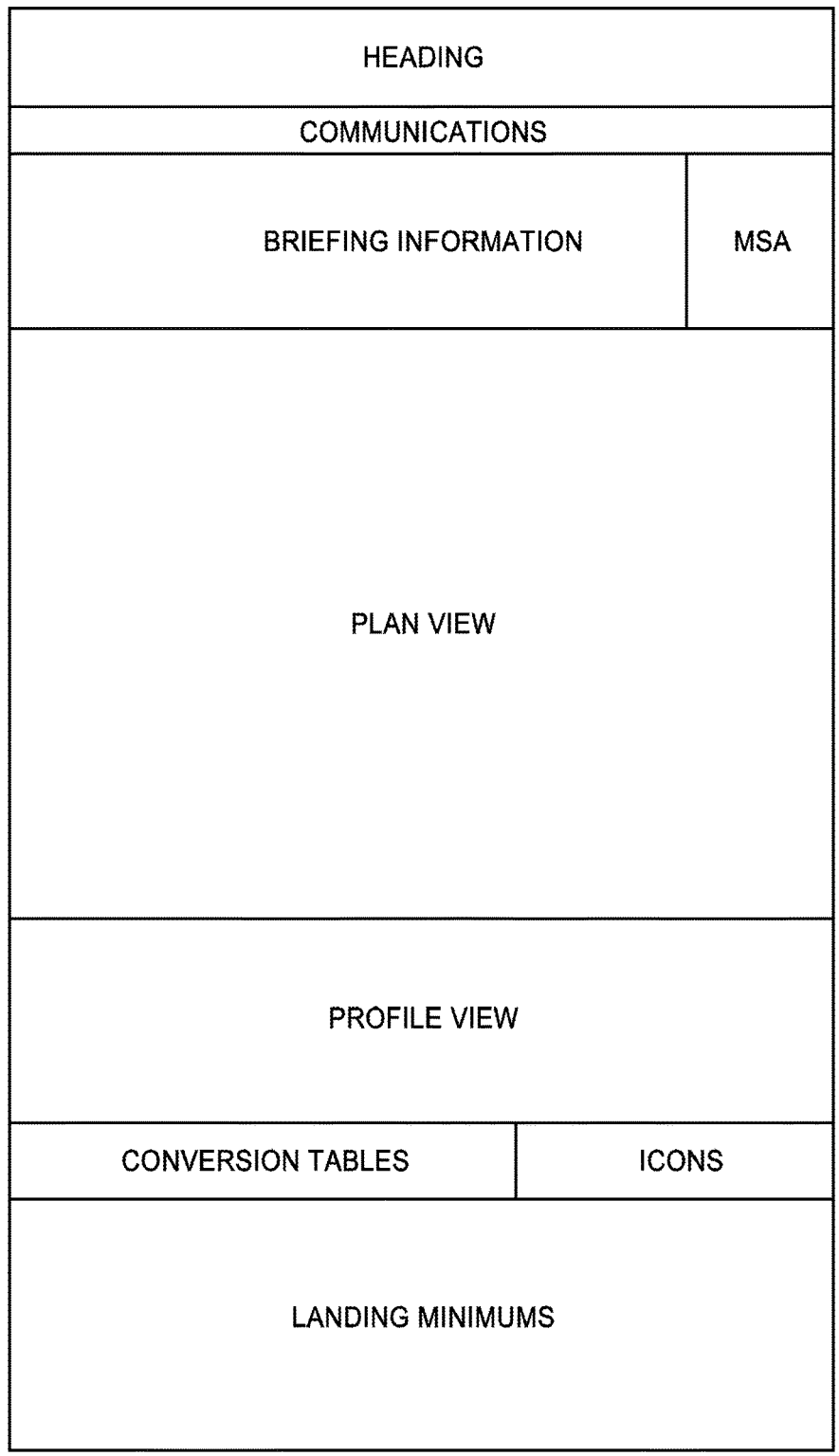
FIG. 2B depicts an exemplary standardized format of the IAP of FIG. 2A.

Referring now to FIG. 2B, a standardized format for the Jepp chart is shown. As illustrated, the format of the Jepp chart includes the following sections: heading, communications, briefing information, MSA (minimum safe altitude), plan view, profile view, conversion tables, icons, and landing minimums. By comparing FIG. 2A with FIG. 2B, one may determine the section within which the IAP information of FIG. 2A falls or a category within which the information may be placed.

Some advantages and benefits of the inventive concepts disclosed herein are shown in FIGS. 3A through 7, illustrating how information presented in an IAP chart may be presented by the inventive concepts disclosed herein. As disclosed, redundant information contained in some sections of the IAP chart may be omitted, and other sections may be reorganized and presented in an order that is most commonly used by the pilot. Information contained in NOTAM(s) may be extracted and presented if relevant to the IAP.

Data is presented on different pages that are accessible via a pilot's interaction of a graphical user interface (GUI), where one or more GUIs could include one or more widgets defined in ARINC Specification 661 entitled "Cockpit Display System Interfaces to User Systems" (ARINC 661), an aviation industry standard which is hereby and herein incorporated by reference in its entirety. As illustrated, tabs are being utilized as a row of interactive GUIs abutting or contiguous with a horizontal side of the page being displayed.

Data is presented on different pages that are tabbed, and data for any given tabbed page is organized in the order used during the IAP. The first thing a pilot may need to know during the initial part of the IAP is the minimum safe altitude (MSA). Then, the pilot may need to know the frequency and course of the localizer. Next, the pilot may need to know the angle of the glide slope of an IAP. Then, the pilot may need to know of other components of the IAP.

Referring now to FIG. 3A, an image 150 of a first page presentable by the display system 140 and exemplary of the inventive concepts disclosed herein is illustrated. As shown, the first page includes an alpha-numeric presentation of IAP information along with corresponding FMS information. The first page is presented against a background page containing a header section providing the information as that provided in the header section of the exemplar Jepp chart.

At the top of the first page is an APCH tab signifying an alpha-numeric presentation of selected approach information drawn from a plurality of IAP chart sections. As shown, there are a plurality of columns and a plurality of rows being presented. The first column includes the following features: MSA, LOC (localizer), CRS (course), G/S (glide slope), LOM (locator outer marker), MM (middle marker), DA (decision altitude), IM (inner marker), Ceiling, VIS (visibility), ALS (approach lighting system), TDZE (touchdown zone elevation), and APT (airport elevation). The information may be presented in a color configurable by a manufacturer and/or end-user and indicative of a fully-functional IAP; here, it will be assumed that the color of the alpha-numeric characters is white.

The second column captioned CHART includes alpha-numeric information for features drawn from a plurality of sections of the IAP chart. Similar to the first column, the color of the alpha-numeric characters in the second column is assumed to be white.

MSA feature information may be drawn from the MSA section; here, the content of the MSA feature row indicates an MSA of 7,500 feet mean sea level (MSL).

LOC feature information may be drawn from the communications and/or plan view sections; here, the content of the LOC feature row indicates the a three-letter identification of the ground radio station transmitting a localizer signal over the frequency of 109.3 MHz.

CRS feature information may be drawn from the communications, plan view, and/or profile view sections; here, the content of the CRS feature row indicates the direction of the localizer course of 096 degrees.

G/S feature information may be drawn from the conversion tables section (and/or partly from the communications section); here, the content of the G/S feature row indicates a G/S angle of 3.00 degrees.

LOM may be drawn from the communications and/or profile view sections; here, the content of the LOM feature row indicates that, if the aircraft is flying on the G/S, the aircraft should cross over the LOM at 2,100 feet MSL, and that the distance between the LOM and landing threshold is 6.2 nautical miles (NM).

MM may be drawn from the profile section; here, the content of the MM feature row indicates that, if the aircraft is flying on the G/S, the aircraft should cross over the MM at 240 feet MSL, and that the distance between the MM and landing threshold is 0.5 NM.

DA may be drawn from the communications and/or landing minimums sections; here, the content of the DA feature row indicates that the DA is 218 feet MSL.

IM may be drawn from the profile view section; here, the content of the IM feature row indicates that the distance between the IM and the landing threshold is 0.2 NM.

Ceiling and Visibility may be drawn from the landing minimums section; here, the content of the Ceiling and Visibility features rows indicate that the ceiling and visibility requirements for flying the IAP is 200 feet above ground level (AGL) and 800 meters (m), respectively.

ALS may be drawn from the icons section, a section showing icons and text corresponding to part of the missed approach; here, the content of the ALS feature row indicates that the type of ALS for the runway is an Approach Lighting System with Sequenced Flashing Lights—Configuration 2 (ALSF—II).

TDZE may be drawn from the briefing information and profile sections; here, the content of the TDZE feature row indicates that the TDZE is 18 feet MSL.

Apt Elev may be drawn from the information section; here, the content of the Apt Elev feature row indicates that the elevation of the airport is 28 feet MSL.

The third column captioned FMS includes the alpha-numeric information for features drawn from a source of the feature information (here, an FMS database); however, not all of the features shown on the IAP are included in the FMS database. For those being presented, the pilot may be informed of the presence of a mismatch between the IAP chart data and the FMS data in the feature row. Where there is no mismatch, the information could be presented in a color (e.g., green) commensurate with a favorable indication in the feature row. As observed, there is an information mismatch of the CRS feature, where the information received from the FMS indicates a CRS of 098. As such, this information may be made visually conspicuous; here, the information could be presented in yellow, commensurate with an unfavorable indication in the CRS feature row. Here, the mismatch could be the result of an erroneous manual entry of the localizer course or incorrect data being stored in the FMS database. It should be noted that the color of the CRS feature and the second column of the CRS feature row information remains white to indicate that the IAP is operating normally.

Referring now to FIG. 3B, an image 150a presenting the first page of FIG. 3A is illustrated, where information being presented has changed in response to a NOTAM being received; in the NOTAM, airmen are notified that the ALS for Runway 10 at SBGL/GIG is out of service. This NOTAM could have been entered via the manual input device 124 and/or received via the datalink 126. As shown in landing minimums section of the exemplar Jepp chart, the inoperability or absence of the ALS (indicated by "ALS out") increases the visibility requirements for flying the IAP from 800 m to 1,200 m.

In response to receiving the NOTAM, the content of the ALS feature row in the second column has changed from "ALSF—II" to "OUT" and "NOTAM", where the latter is underlined to indicate an interactive link through which the pilot may select and view the NOTAM. In addition, the content of the Visibility feature row in the second column has changed from "800 m" to "1200 m" and "ALS out", the latter providing the reason change. As shown, the information has changed color from white to yellow to indicate that the IAP is less than fully-functional.

Referring now to FIG. 3C, an image 150b presenting the first page of FIG. 3A is illustrated, where information being presented has changed in response to a second NOTAM being received; in the NOTAM, airmen are notified that the G/S of the instrument landing system (ILS) for Runway 10 at SBGL/GIG is out of service. This NOTAM could have been received via the datalink 126 or entered via the input device 124. As shown in landing minimums section of the exemplar Jepp chart, the inoperability or absence of the G/S (indicated by "GS out") increases the ceiling requirements for flying the IAP from 200 feet to 500 feet (assuming a C category aircraft) and visibility requirements for flying the IAP from 800 m to 1,200 m. In addition, without an operable G/S of the ILS, a DA is replaced with a Minimum Descent Altitude (MDA), changing the DH of 200 feet to an MDA of 500 feet.

In response to receiving the NOTAM, the content of the G/S feature row in the second column has changed to "OUT" and "NOTAM", where the latter is a graphical user interface (GUI) or widget through which the pilot may select and view the NOTAM. In addition, the content of the Ceiling feature row in the second column has changed from "200"

to "500" and "G/S Out", the content of the Visibility feature row in the second column has changed from "800 m" to "1200 m" and "G/S out", the DH feature in the first column has changed to an MDA feature, and the content of the DH feature row in the second column has been changed to an MDA feature row presenting "500" and "G/S out". As shown, the information has changed color from white to yellow to indicate that the IAP is less than fully-functional In response to the changes of content in the second column, a mismatch of information within rows now exists. Because the G/S is out, the G/S angular measurement of 3.00 degrees received from the FMS is no longer correct. In response, the mismatch in the G/S feature row is indicated by the yellow alpha-numeric information in the third column. Similarly, because the DA has been replaced by an MDA, the DA of 218 feet received from the FMS is no longer correct. In response, the mismatch of information in the MDA row is indicated by the yellow alpha-numeric information in the third column.

Referring now to FIGS. 4A through 4C, images 152 through 152b presentable by the display system 140 are illustrated as alternate configurations to images 150 through 150b, respectively. As shown, images 152 though 152b include similar alpha-numeric presentations of information presented in images 150 through 150b, respectively, but with wider page layouts.

As shown in FIG. 4A, the third column of image 152 includes the source of the information for each matching feature as an alternate to image 150 in which captions CHART and FMS are employed. As shown in FIG. 4B, an IAP that is less than fully-functional is indicated by the color red in image 152a as an alternate to the color yellow employed in image 150a. As shown in FIG. 4C, a less-than-fully-functional IAP and a mismatch of information is indicated by the color red in image 152b as an alternate to the color yellow employed image 150b.

Referring now to FIGS. 5A and 5B, images 160 and 162 of second pages presentable by the display system 140 are illustrated. At the top of the second page is a Notes tab signifying an alpha-numeric presentation of selected approach information drawn from the briefing information section of the IAP chart.

As shown, there are a plurality of columns and a plurality of rows being presented. The first column includes the following features: ALT SET (altimeter setting information), TDZ ELEV, (barometric pressure equivalents), TRANS LEVEL (airport/procedure transition level at which altitude setting may be changed from standard barometric setting to an actual barometric setting), TRANS ALT (airport/procedure transition altitude at which altitude setting may be changed from actual barometric setting to a standard barometric setting), and NOTE 1 (notes applicable to the IAP).

The second column includes alpha-numeric information for features drawn from the briefing information section of the IAP chart. The content of the ALT SET and TDZ ELEV feature rows indicates measurements in HPA (Hectopascal) for altimeter setting information and barometric equivalents. The content of the TRANS LEVEL feature row indicates that ATC (air traffic control) sets the airport/procedure transition level. The content of the TRANS ALT feature row indicates an airport/procedure transition altitude of 5,000 feet MSL. The content of the NOTE 1 feature row (and additional NOTE feature rows as needed) informs the pilot of notes applicable to the IAP shown in the briefing information section.

Referring now to FIGS. 6A and 6B, images 170 and 172 of third pages presentable by the display system 140 are illustrated. At the top of the third page is a Missed tab signifying an alpha-numeric presentation of selected Missed Approach information drawn from the briefing information section of the IAP chart.

As shown, there is a plurality of columns being presented. The first column includes a MISSED APCH feature. The second column includes alpha-numeric information for the MISSED APCH feature drawn from the briefing information section. The content of the MISSED APCH feature row informs the pilot of the missed approach procedure of the IAP shown in the briefing information section.

Referring now to FIGS. 7A and 7B, images 180 and 182 of fourth pages presentable by the display system 140 are illustrated. At the top of the fourth page is a Comms tab signifying an alpha-numeric presentation of selected approach information drawn from the communications section of the IAP chart.

As shown, there are a plurality of columns and a plurality of rows being presented. The first column includes the following features: ATIS (automatic terminal information service), APPROACH, (approach control), TOWER (airport control tower), and GROUND (airport ground control). These are shown from up to down in the order of a pilot's normal use.

The second column includes alpha-numeric information for features drawn from the communications section of the IAP chart. The content of the ATIS feature row indicates the frequency for ATIS. The content of the APPROACH feature row indicates the name of the approach control and the frequencies on which it operates. The content of the TOWER feature row indicates the name of the airport control tower and the frequencies on which it operates. The content of the GROUND feature row indicates the frequency on which the airport ground control operates.

Referring now to FIG. 8A, an image 152c is illustrated as alternate configuration to image 152 of FIG. 4A. As shown in FIG. 8A, tabs may be vertically disposed along a vertical side of the displayed page, the tabs being utilized as a column of interactive GUIs abutting or contiguous with the vertical side of the displayed page.

Referring now to FIG. 8B, an image 152d is illustrated as alternate configuration to image 152, where image 152d may be presentable by a display unit of the display system 140. As shown in FIG. 8B, the pilot is able to interact with a GUI (here, a drop-down menu) from which the multiple pages of the IAP chart information may be accessed.

Figure 9:
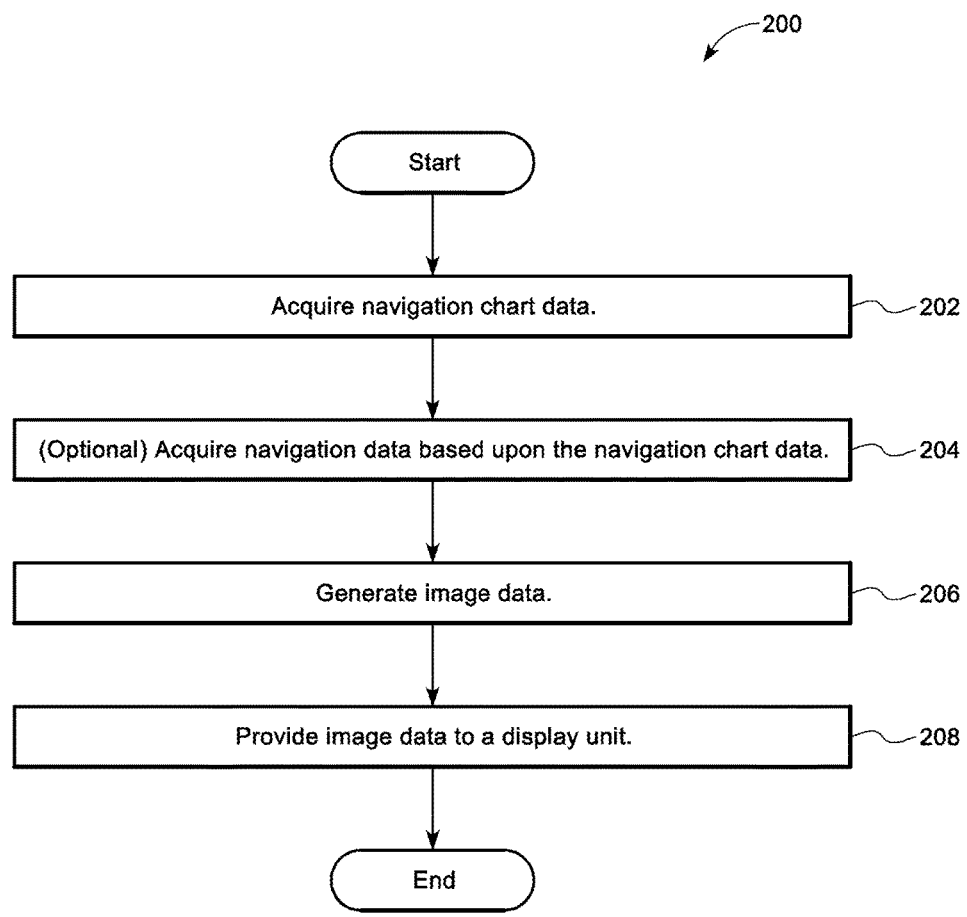
FIG. 9 illustrates a flowchart disclosing an embodiment of a method for generating and presenting navigation chart information.

Referring now to FIG. 8C, an image 152e is illustrated as alternate configuration to image 152, where image 152e may be presentable by a display unit of the display system 140. As shown in FIG. 8C, the pilot is able to interact with a row of interactive GUIs (here a series of virtual pushbuttons) from which the multiple pages of the IAP chart information may be accessed FIG. 9 depicts flowchart 200 providing an example method for generating and/presenting an image of pilot-friendly, navigation chart information, where the IG 130 may be programmed or configured with instructions corresponding to the following modules that that may be continuously or periodically executed throughout the aircraft operation. The IG 130 may be a processing unit(s) of a module such as, but not limited to, a printed circuit card assembly having one or more input interfaces (e.g., virtual or physical computer ports) to facilitate data communications with the IG 130, i.e., the receiving and providing of data (e.g., one or more electrical or optical signals including data and/or being indicative of data). For the accomplishment of the following modules embodied in FIG. 9, the acquiring of data is synonymous and/or interchangeable with reading, receiving, and/or the retrieval of data.

The method of flowchart 200 begins with module 202 with the IG 130 acquiring navigation chart data representative of navigation chart information published on one page of a navigation chart from the navigation chart data source 110, where the navigation chart is published with a first visual format comprised of a plurality of sections. In some embodiments, the navigation chart could be an IAP chart.

The method of flowchart 200 continues with an optional module 204 with the IG 130 acquiring navigation data based upon the navigation chart data, where the navigation data could be acquired from the navigation data source 120. In some embodiments, the navigation data could be representative of IAP information and/or NOTAM information acquired from the FMS 122, the input device 124, and/or through the datalink 126.

The method of flowchart 200 continues with module 206 with the IG 130 generating an image data set as a function of the acquired navigation chart data and, if acquired, the navigation data. The image data set could be representative of a plurality of page images presented against a background page as discussed above. In some embodiments, the image data set could be further representative of a pattern of GUIs such as a row(s) or column(s) of GUIs. In some embodiments, the GUIs could be tabs. Each page could include one or more cells formed by the intersection of one or more columns and one or more rows, each cell being formed by an intersection of one column and one row. Each row may include one cell populated with information about the feature name, and a second cell populated with information about the feature. The information of each populated cell may be presented visually in a page at a location corresponding to the intersection of the column and the row location of the populated cell. In some embodiments, each row may include a third cell populated with content of the information represented in the navigation data and/or the second cell could be populated with content of the information represented in the navigation data.

The method of flowchart 200 continues with module 208 with the IG 130 providing the image data set to the display system 140 comprised of one or more display units. Each display unit may be configured to receive the image data set and present a page represented in the image data set to one or more viewers, whereby navigation chart information is presented in a tabular format to the viewer. Then, the method of flowchart 200 ends.

It should be noted that the steps of the method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the scope of the inventive concepts disclosed herein. It is intended that all modifications, permutations, enhancements, equivalents, and improvements thereto that are apparent to those skilled in the art upon a reading of the specification and a study of the drawings are included within the true spirit and scope of the inventive concepts disclosed herein. It is therefore intended that the following appended claims include all such modifications, permutations, enhancements, equivalents, and improvements falling within the true spirit and scope of the inventive concepts disclosed herein.

What is claimed is:

1. A system for presenting navigation chart information, comprising:

a first source of data comprised of a source of instrument approach procedure (IAP) chart data representative of a plurality of IAP charts, where each IAP chart includes predefined IAP feature information for each IAP feature of a plurality of IAP features appearing in a plurality of sections on one page including a plan view section presenting a lateral pictorial of a flight path and a profile view section presenting a vertical pictorial of the flight path, where the predefined IAP feature information of a first portion of the plurality of IAP features is repeated in more than one section;

a second source of data comprised of an aircraft-installed source of navigation data including a flight management system, where the navigation data is representative of real-time IAP feature information of a second portion of the plurality of IAP features;

an image generator including at least one processor coupled to a non-transitory processor-readable medium storing processor-executable code and configured to:

acquire IAP chart data of one IAP chart while in flight from the first source;

acquire navigation data while in flight from the second source;

determine whether there is least one mismatch between the real-time IAP feature information and the predefined IAP feature information of the second portion;

generate an image data set as a function of the acquired IAP chart data and the acquired navigation data, where the image data set is representative of a plurality of page images comprised of the plurality of IAP features divided among the plurality of page images, where a pilot controls which one page image of the plurality of page images is presented, each real-time IAP feature information is presented in a row with one predefined IAP feature information of the same IAP feature of the second portion, each real-time IAP feature information and each predefined IAP feature of the second portion are presented only once in the plurality of page images, each IAP feature and predefined IAP feature information is presented in a first visual format, each real-time IAP feature information for which there is no mismatch is presented in a second visual format, each real-time IAP feature information for which there is mismatch is presented in a third visual format, and the lateral and vertical pictorials of the flight path are excluded from the plurality of page images;

provide the image data set to an aircraft-installed display unit; and the aircraft-installed display unit configured to receive the image data set and present an image represented therein, whereby an amount of the plurality of predefined IAP features presented on any one page image of the plurality of page images is less than an amount of predefined IAP features presented in the one IAP chart, the repetitiveness of the predefined IAP feature information of the first portion is eliminated, and the real-time IAP feature information provides visual redundancy for the predefined IAP feature information of the second portion to enable the pilot's ability to visually recognize mismatched IAP feature information while performing the IAP in preparation of landing.

2. The system of claim 1, wherein the image data set is further comprised of a pattern of graphical user interfaces through which the pilot controls which one page image of the plurality of page images is presented.

3. The system of claim 2, wherein the pattern of graphical user interfaces is presented as tabs contiguous with the one page image of the plurality of page images being presented.

4. The system of claim 1, wherein each row in which each real-time IAP feature information is presented with one predefined IAP feature information is part of a tabular format comprised of a plurality of columns and a plurality of rows.

5. The system of claim 4, wherein each one of the plurality of cells is formed by an intersection of one column of the plurality of columns and one row of the plurality of rows, each cell of a first column is populated with a name of one IAP feature, and each cell of a second column is populated with the feature information of the one IAP feature.

6. The system of claim 1, wherein the aircraft-installed source of navigation data further includes at least one of a datalink and pilot input device, where the navigation data is further representative of at least one inoperable IAP feature; and the image generator is further configured to:

determine an effect on at least one predefined IAP feature information as a function of the at least one inoperable IAP feature, such that at least the determined effect on the at least one predefined IAP feature information is presented in a fourth visual format in lieu of the first visual format, thereby enabling the pilot's ability to visually recognize an existence of the at least one inoperable IAP feature and the effect on at least one predefined IAP feature information.

7. The system of claim 6, wherein at least one inoperable IAP feature represented in the navigation data is provided in a Notices to Airmen (NOTAM), such that a link to the NOTAM is presented in a row with the inoperable IAP feature of the NOTAM.

8. A device for generating navigation chart information, comprising:

an image generator including at least one processor coupled to a non-transitory processor-readable medium storing processor-executable code and configured to:

acquire instrument approach procedure (IAP) chart data of one IAP chart while in flight from a source of IAP chart data representative of a plurality of IAP charts, where each IAP chart includes predefined IAP feature information for each IAP feature of a plurality of IAP features appearing in a plurality of sections on one page including a plan view section presenting a lateral pictorial of a flight path and a profile view section presenting a vertical pictorial of the flight path, where the predefined IAP feature information of a first portion of the plurality of IAP features is repeated in more than one section;

acquire navigation data while in flight from an aircraft-installed source of navigation data including a flight management system, where the navigation data is representative of real-time IAP feature information of a second portion of the plurality of IAP features;

determine whether there is least one mismatch between the real-time IAP feature information and the predefined IAP feature information of the second portion;

generate an image data set as a function of the acquired IAP chart data and the acquired navigation data, where the image data set is representative of a plurality of page images comprised of the plurality of IAP features divided among the plurality of page images, where a pilot controls which one page image of the plurality of page images is presented, each real-time IAP feature information is presented in a row with one predefined IAP feature information of the same IAP feature of the second portion, each real-time IAP feature information and each predefined IAP feature of the second portion are presented only once in the plurality of page images, each IAP feature and predefined IAP feature information is presented in a first visual format, each real-time IAP feature information for which there is no mismatch is presented in a second visual format, each real-time IAP feature information for which there is mismatch is presented in a third visual format, and the lateral and vertical pictorials of the flight path are excluded from the plurality of page images; and provide the image data set to an aircraft-installed display unit, whereby an amount of the plurality of predefined IAP features presented on any one page image of the plurality of page images is less than an amount of predefined IAP features presented in the one IAP chart, the repetitiveness of the predefined IAP feature information of the first portion is eliminated, and the real-time IAP feature information provides visual redundancy for the predefined IAP feature information of the second portion to enable the pilot's ability to visually recognize mismatched IAP feature information while performing the IAP in preparation of landing.

9. The device of claim 8, wherein the image data set is further comprised of a pattern of graphical user interfaces through which the pilot controls which one page image of the plurality of page images is presented.

10. The device of claim 9, wherein the pattern of graphical user interfaces is presented as tabs contiguous with the one page image of the plurality of page images being presented.

11. The device of claim 8, wherein each row in which each real-time IAP feature information is presented with one predefined IAP feature information is part of a tabular format comprised of a plurality of columns and a plurality of rows.

12. The device of claim 11, wherein
each one of the plurality of cells is formed by an intersection of one column of the plurality of columns and one row of the plurality of rows,
each cell of a first column is populated with a name of one IAP feature, and
each cell of a second column is populated with the feature information of the one IAP feature.

13. The device of claim 8, wherein
the image generator is further configured to:
determine an effect on at least one predefined IAP feature information as a function of at least one inoperable IAP feature of which the navigation data is further representative, such that
at least the determined effect on the at least one predefined IAP feature information is presented in a fourth visual format in lieu of the first visual format, thereby
enabling the pilot's ability to visually recognize an existence of the at least one inoperable IAP feature and the effect on at least one predefined IAP feature information.

14. The device of claim 13, wherein
at least one inoperable IAP feature represented in the navigation data is provided in a Notices to Airmen (NOTAM), such that
a link to the NOTAM is presented in a row with the inoperable IAP feature of the NOTAM.

15. A method for generating navigation chart information, comprising:
acquiring, by at least one processor executing processor-executable code, instrument approach procedure (IAP) chart data of one IAP chart while in flight from a source of IAP chart data representative of a plurality of IAP charts, where
each IAP chart includes predefined IAP feature information for each IAP feature of a plurality of IAP features appearing in a plurality of sections on one page including a plan view section presenting a lateral pictorial of a flight path and a profile view section presenting a vertical pictorial of the flight path, where
the predefined IAP feature information of a first portion of the plurality of IAP features is repeated in more than one section;
acquiring navigation data while in flight from an aircraft-installed source of navigation data including a flight management system, where
the navigation data is representative of real-time IAP feature information of a second portion of the plurality of IAP features;
determining whether there is least one mismatch between the real-time IAP feature information and the predefined IAP feature information of the second portion;
generating an image data set as a function of the acquired IAP chart data and the acquired navigation data, where
the image data set is representative of a plurality of page images comprised of the plurality of IAP features divided among the plurality of page images, where
a pilot controls which one page image of the plurality of page images is presented,
each real-time IAP feature information is presented in a row with one predefined IAP feature information of the same IAP feature of the second portion,
each real-time IAP feature information and each predefined IAP feature of the second portion are presented only once in the plurality of page images,
each IAP feature and predefined IAP feature information is presented in a first visual format,
each real-time IAP feature information for which there is no mismatch is presented in a second visual format,
each real-time IAP feature information for which there is mismatch is presented in a third visual format, and
the lateral and vertical pictorials of the flight path are excluded from the plurality of page images; and
providing the image data set to an aircraft-installed display unit, whereby
an amount of the plurality of predefined IAP features presented on any one page image of the plurality of page images is less than an amount of predefined IAP features presented in the one IAP chart,
the repetitiveness of the predefined IAP feature information of the first portion is eliminated, and
the real-time IAP feature information provides visual redundancy for the predefined IAP feature information of the second portion to enable the pilot's ability to visually recognize mismatched IAP feature information while performing the IAP in preparation of landing.

16. The method of claim 15, wherein the image data set is further comprised of a pattern of graphical user interfaces through which the pilot controls which one page image of the plurality of page images is presented.

17. The method of claim 16, wherein the pattern of graphical user interfaces is presented as tabs contiguous with the one page image of the plurality of page images being presented.

18. The method of claim 15, wherein
each row in which each real-time IAP feature information is presented with one predefined IAP feature information is part of a tabular format comprised of a plurality of columns and a plurality of rows, where
each one of the plurality of cells is formed by an intersection of one column of the plurality of columns and one row of the plurality of rows,
each cell of a first column is populated with a name of one IAP feature, and
each cell of a second column is populated with the feature information of the one IAP feature.

19. The method of claim 15, further comprising:

determining an effect on at least one predefined IAP feature information as a function of at least one inoperable IAP feature of which the navigation data is further representative, such that at least the determined effect on the at least one predefined IAP feature information is presented in a fourth visual format in lieu of the first visual format, thereby enabling the pilot's ability to visually recognize an existence of the at least one inoperable IAP feature and the effect on at least one predefined IAP feature information.

20. The method of claim 19, wherein at least one inoperable IAP feature represented in the navigation data is provided in a Notices to Airmen (NOTAM), such that a link to the NOTAM is presented in a row with the inoperable IAP feature of the NOTAM.

\* \* \* \* \*